United States Patent
Kallenberger et al.

[11] Patent Number: 5,245,882
[45] Date of Patent: Sep. 21, 1993

[54] APPARATUS FOR DRIVE COMPONENT DISCONNECTION

[75] Inventors: Harvey J. Kallenberger, Wind Lake; Robert H. Blaszynski, Waukesha; Jerry C. Sem, Pewaukee, all of Wis.

[73] Assignee: Harnischfeger Corporation, Milwaukee, Wis.

[21] Appl. No.: 921,913

[22] Filed: Jul. 29, 1992

[51] Int. Cl.$^5$ .................. B62D 57/02; F16H 57/00
[52] U.S. Cl. ........................... 74/405; 37/395; 37/DIG. 17; 180/8.5
[58] Field of Search ............ 74/405; 37/115, 116, 37/DIG. 17; 180/8.1, 8.5

[56] References Cited

U.S. PATENT DOCUMENTS

| | | | |
|---|---|---|---|
| 1,627,984 | 5/1927 | Martinson | 180/8.5 |
| 2,259,199 | 10/1941 | Cameron et al. | 180/8.5 |
| 3,078,941 | 2/1963 | Baron et al. | 180/8.5 |
| 3,500,945 | 3/1970 | Barden et al. | 180/8.5 |
| 3,631,735 | 1/1972 | McCarty | 74/405 |
| 3,949,823 | 4/1976 | Herr, Jr. | 74/405 |
| 4,041,792 | 8/1977 | Miller | 74/405 |

*Primary Examiner*—Allan D. Herrmann
*Attorney, Agent, or Firm*—Jansson & Shupe, Ltd.

[57] ABSTRACT

The invention involves a machine, e.g., a walking dragline having a drive gear, a driven member which loads (and wears) gear teeth unequally and an interconnecting shaft. The quill-mounted gear is separately supported by bearings. The shaft can be moved axially and when so repositioned, it is also separately supported by other bearings. When the gear needs to be "indexed," (due to unequal tooth wear) the shaft is moved axially out of connection with the gear but remains connected to the eccentric. The gear can then be indexed using its drive motor and the shaft can be re-engaged with the quill without the necessity of auxiliary lifting equipment and without disengaging the shaft from the eccentric.

8 Claims, 6 Drawing Sheets

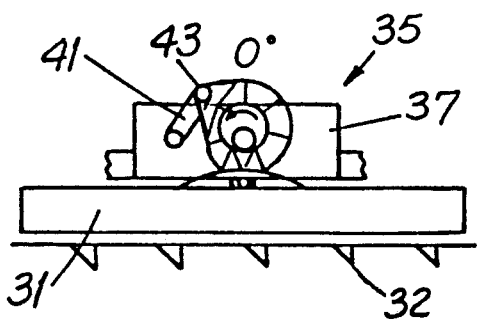
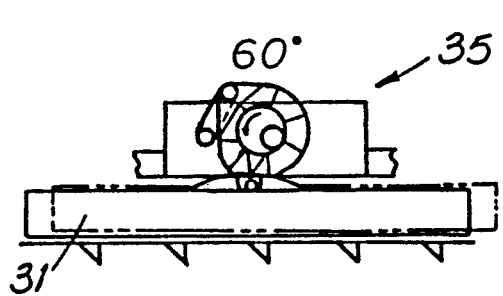
FIG.3A  FIG.3B
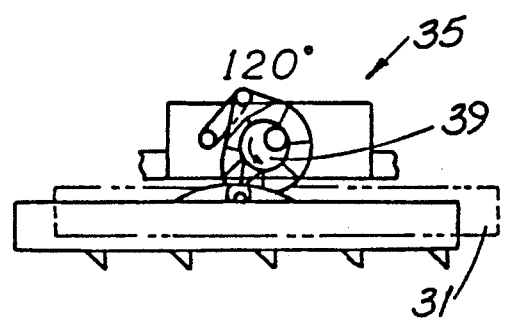
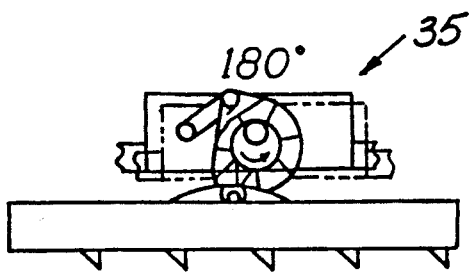
FIG.3C  FIG.3D
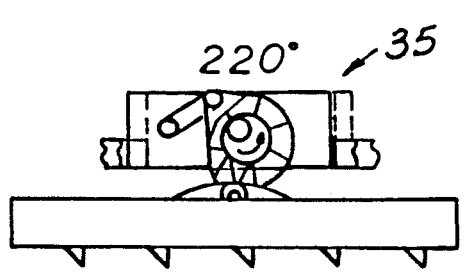
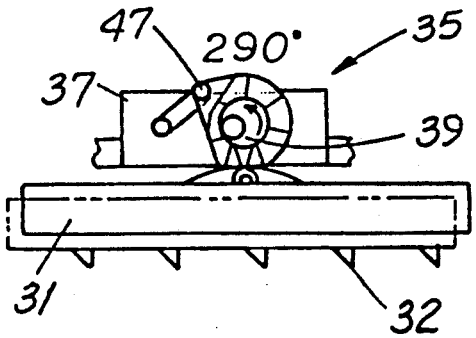
FIG.3E  FIG.3F
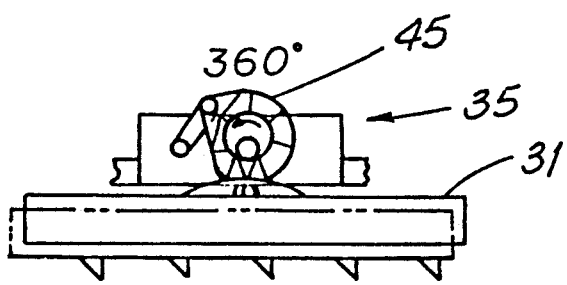
FIG.3G

APPARATUS FOR DRIVE COMPONENT DISCONNECTION

FIELD OF THE INVENTION

This invention is related generally to powered machinery and, more particularly, to machinery transmitting power from a prime mover through a mechanical drive train.

BACKGROUND OF THE INVENTION

Machinery powered by electric motors or internal combustion engines (typically referred to as "prime movers") often use gears, shafts and the like to form a drive train providing power used to perform an end-use function. Automobiles, metal cutting and shaping machines, toggle-type presses and construction and earth-moving machines are but a few examples of such machinery.

As more specific examples, such machinery drive trains uses gears and shafts in speed reducers and right angle drives to reduce speed (from that of the motor or engine output shaft) and increase torque and/or to change the direction of power flow. Shafts interconnect "stages" of gearing or connect a final gearing stage to an output device such as automobile wheels, press head or, in the case of an earth-moving machine known as a walking dragline, to a "walk leg" drive.

In such machines, the drive train components (gears, shafts and the like) range in size from a few pounds to several thousand pounds. Clearly, small drive train components can be readily lifted, manually placed and positioned by one or two maintenance workers. Equally clear is the fact that assembly and maintenance personnel working with very large drive train components usually need auxiliary lifting equipment, a crane or the like, to help them lift and place such components.

Another characteristic of certain types of machines, e.g., toggle presses and walking draglines, is that certain machine functions tend to load (and wear) certain drive train components unevenly. For example, the drive train of a toggle press (especially that portion driving the toggle press head mechanism) is most heavily loaded over only that fraction of a revolution relating to the final, piece-forming part of the press stroke. In a walking dragline, the walk leg drive is most heavily loaded only during that part of a revolution during which the dragline is being lifted to take a "step."

To keep the machine functioning efficiently and in condition to satisfactory perform its task, worn parts need to be replaced. However, with larger machines, maintenance and parts replacement can be an imposing challenge, especially if the parts are large and unwieldly. Nowhere is this more true than in large mobile machines such as earth-moving and earth-excavating machinery.

Such machinery is available in a wide variety of types ranging from the familiar rubber-tire mounted and crawler-mounted to the less-common dragline. A dragline is often used for removing top soil and "overburden" to expose a valuable mineral, e.g., coal, beneath but near the earth's surface.

Draglines are equipped with an angularly-extending boom from which is suspended a "bucket" having an open mouth and digging teeth, both toward the main portion of the machine. Overburden is removed by placing the bucket on the ground at a point distant from the machine and pulling it toward the machine, filling the bucket in the process. Once filled, the machine pivots about a central axis and the bucket emptied at a spoil pile somewhat away from the area being excavated.

Smaller draglines are crawler mounted (much like a military tank) and capable of movement in the same way albiet at much slower speeds. However, as draglines (and their digging buckets) increased in size, crawler mounting was found to be impractical and in the early 1900's, the "walking" dragline was developed. The walking dragline is so named because it takes short "steps" and uses a "walk leg" mechanism (which resembles a human leg) to do so. A difference is that in a walking dragline, both legs step simultaneously.

To give some perspective to the following discussion, a large walking dragline—made by Harnischfeger Industries of Milwaukee, Wisconsin, and incorporating the invention—has a main housing portion (including the machinery deck, operator's cab and the like) which is about 105 feet long, about 80 feet wide, about 40 feet high and weighs about nine million pounds. The boom extends about 300 feet and the capacity of the digging bucket is about 80 cubic yards. The walk legs of such dragline take steps about seven feet in length.

At least because of its size, weight and complexity, several problems attend draglines of earlier configuration. One is that such machines are usually used in remote sites and replacement parts are difficult to deliver and, because of their size and weight, even more difficult to install.

Wear cannot be avoided in any device having relatively moving parts but the efforts of earlier designers of draglines and their drive trains have not been entirely successful in reducing maintenance time and "downtime" of a machine representing a very substantial capital investment. Earlier machine drive trains are sometimes characterized by certain disadvantages. One is that individual drive train components are not self supporting. When being assembled or worked upon for maintenance purposes, one or more of the components must be lifted and handled by auxiliary lifting equipment.

Another, related disadvantage is that such components cannot be readily re-positioned with respect to one another without the use of such lifting equipment. Still another disadvantage is that re-positioning is manual rather than under power of the prime-mover. And the larger the components, the more pronounced are the disadvantages.

An improved drive train apparatus permitting drive component disconnection and re-positioning under power of the prime mover and permitting certain maintenance work without using auxiliary lifting equipment would be an importance advance in the art.

OBJECTS OF THE INVENTION

It is an object of this invention to provide an improved apparatus for drive component disconnection which overcomes some of the problems and shortcomings of devices of the prior art.

Another object of this invention is to provide an improved apparatus which permits drive component disconnection without using auxiliary lifting equipment.

Another object of this invention is to provide an improved apparatus for drive component disconnection wherein drive components are "self-supported."

Yet another object of this invention is to provide an improved apparatus for drive component disconnection in which components can be re-positioned using prime mover power rather than manual effort. How these and other important objects are accomplished will be apparent from the following descriptions taken in conjunction with the drawing.

SUMMARY OF THE INVENTION

This invention is related generally to powered machinery such as an exemplary toggle press, stamping machine or earth-moving machine which transmits power (often, rotary power or "torque") from a prime mover through a mechanical drive train to an end-use function. The invention is an improvement in a machine of that type, all or virtually all of which have a prime mover motor or engine, a drive gear connected directly or indirectly to the prime mover and a driven member.

The invention is particularly useful in situations where, because of certain characteristics of the load imposed on it, the driven member unequally loads the teeth of the gear. Such machine also includes a shaft transferring driving power from the gear to the driven member. The inventive improvement is described in connection with a walking dragline in which the driven member is a walk leg eccentric which, because of the nature of the end-use function, loads the gear teeth unevenly over only about 120° of the gear circumference.

In the improvement, the shaft is supported for axial movement and a quill connects the gear to the shaft by a first set of teeth (such as spline teeth) extending along a first length. A second set of teeth connects the shaft and the member along a second length which is greater than the first length. Axial movement of the shaft along the first length disconnects the gear for free gear rotation while yet maintaining mechanical connection between the shaft and the driven member.

In a highly preferred embodiment, the quill is supported for rotation on a first set of bearings (a bearing on either side of the gear) and the drive gear is mounted to the quill. The first set of teeth includes mating teeth, e.g., spline teeth, on the interior of the quill and on the exterior of the shaft. Such teeth can be engaged and disengaged by sliding axial movement with respect to one another. The second set of teeth includes mating teeth on the interior of the driven member and on the exterior of the shaft.

The shaft is mounted for axial movement between a drive position and a disconnect position, the latter being that where the teeth of the first set of teeth are "disconnected" or disengaged from one another. In the disconnect position, the shaft is supported by a second set of bearings and when a portion of the gear becomes worn, the gear can be freely rotated to an index position without using auxiliary equipment. A highly advantageous feature of the invention is that even though the shaft is disconnected from the gear, the gear remains connected to a source of driving power. Such gear may therefore be rotated or indexed by such source when the shaft and quill are disconnected from one another.

These and other aspects of the invention are described in greater detail below.

BRIEF DESCRIPTION OF THE DRAWING

FIGS. 3A-3G show a sequence of operation of one of the walk legs of the dragline of FIG. 1.

DETAILED DESCRIPTIONS OF THE PREFERRED EMBODIMENTS

Before describing the preferred embodiments, it should be appreciated (and persons of ordinary skill will appreciate) that the improved apparatus 10 and method are applicable to stationary mounted "in-factory" machines and to mobile machinery to secure certain machine components to one another. The invention has special appeal in applications where pins "link" two components together in a way that one is relatively movable with respect to the other. The invention clearly offers convenience in machines of moderate size and becomes more compelling as the size of the machine increases. To help "dramatize" and emphasize this fact, the invention is disclosed in connection with one of the largest types of machines in the world, a walking dragline 11.

Figure 1:
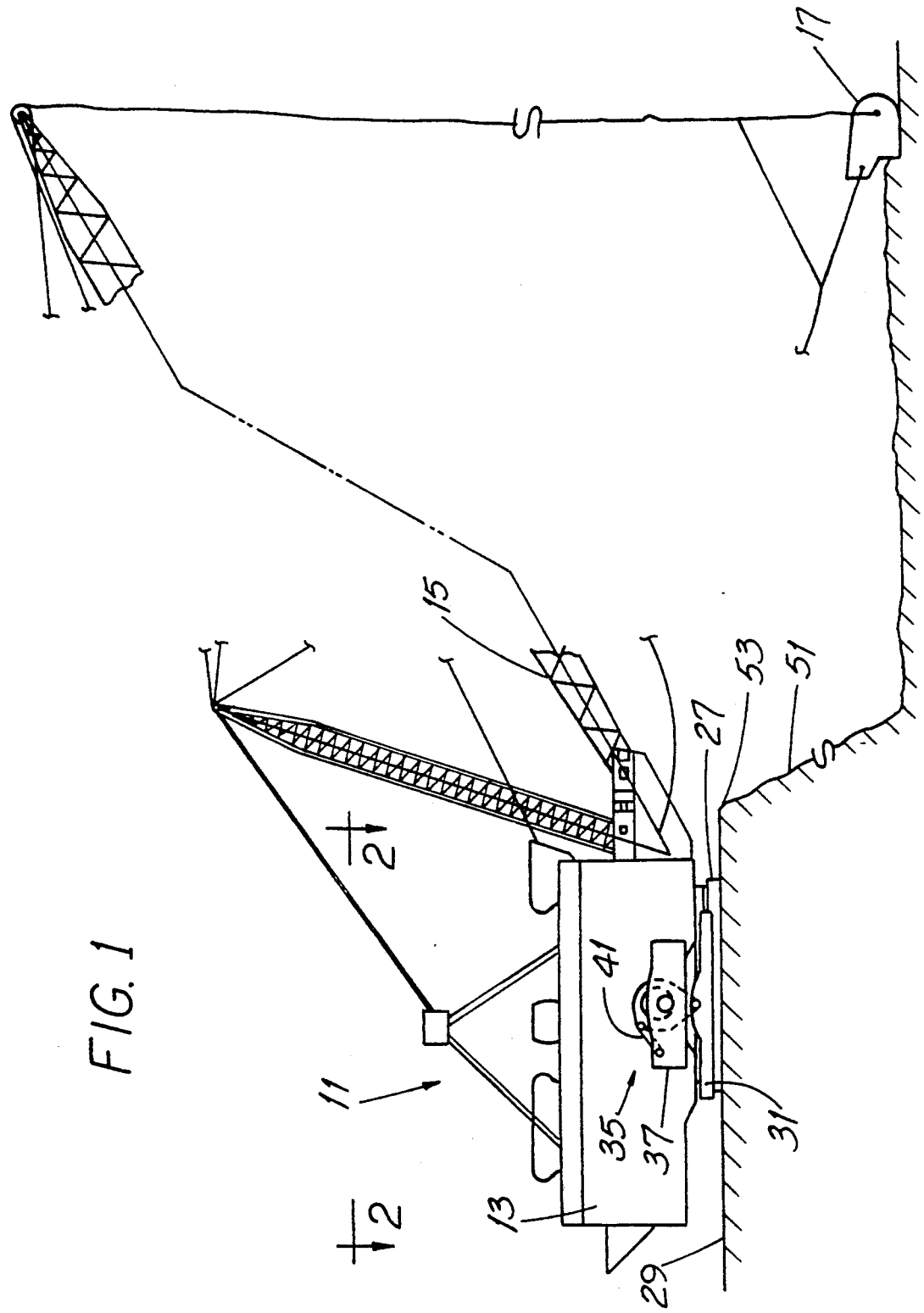
FIG. 1 is a representative side elevation view of a walking dragline.
Figure 2:
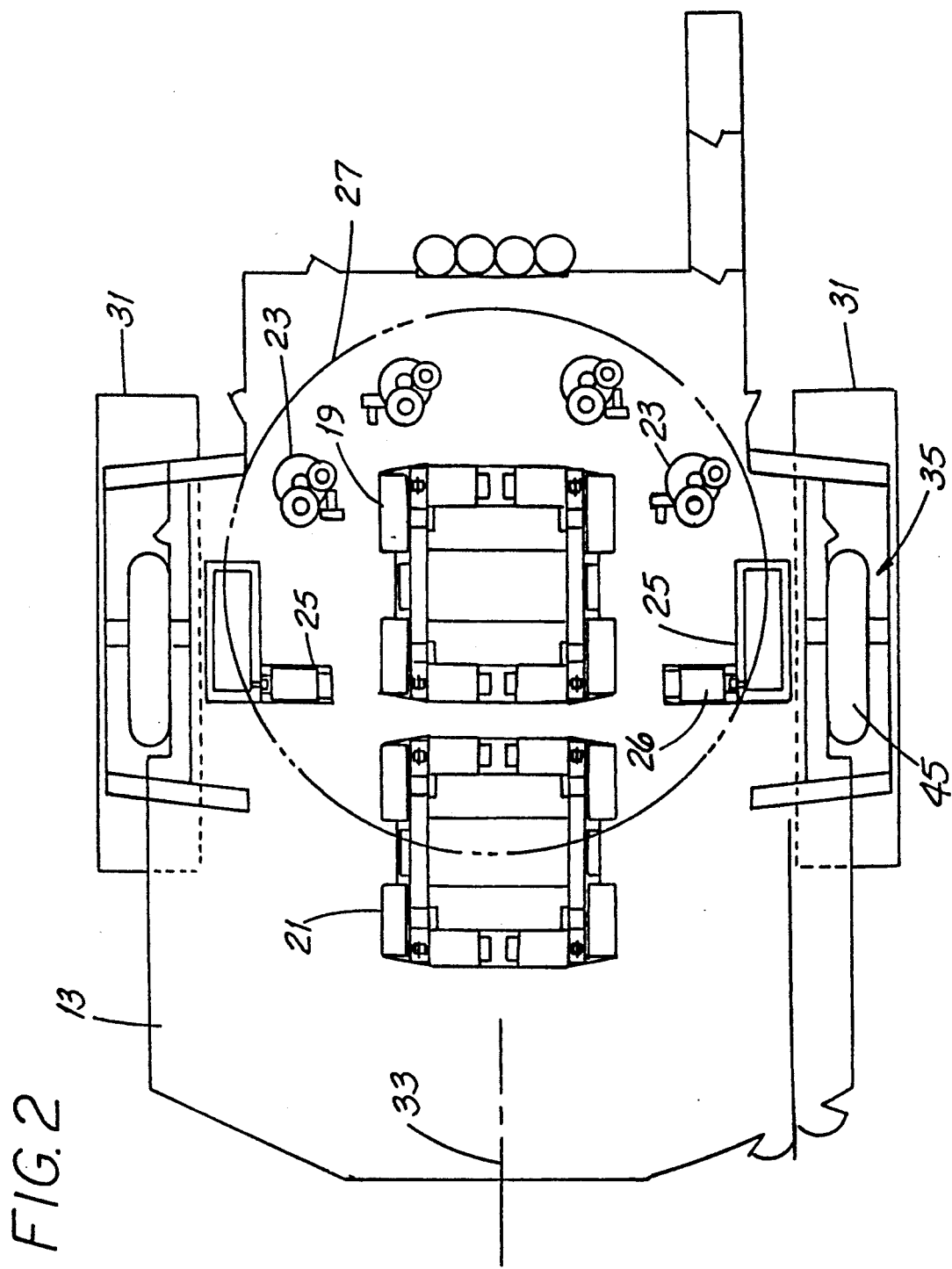
FIG. 2 is a top plan view, in phantom, of the main housing portion of the dragline of FIG. 1, taken along the viewing plane 2—2 thereof and with parts broken away.

Referring first to FIGS. 1 and 2, an exemplary walking dragline 11 includes a main housing portion 13 having a boom 15 extending therefrom to support and manipulate a digging bucket 17. Within the housing portion 13 are mounted the bucket hoist, bucket drag and swing systems 19, 21 and 23, respectively. The drive 25 for the "walking" system is also mounted therein. Such drive 25 includes a source of driving power embodied as an electric motor 26. When digging, the dragline 11 sits on and pivots about a generally circular "tub" or platform 27 which rests on the earth's surface 29.

The dragline 11 also includes a pair of pads or "shoes" 31 which, when moved in unison as described below, lift the platform 27 and move the dragline 11 rearward away from the bucket 17. Movement in the exemplary dragline 11 is in "steps" of about seven feet in length and along the long axis 33 of the main housing portion 13.

Figure 4:
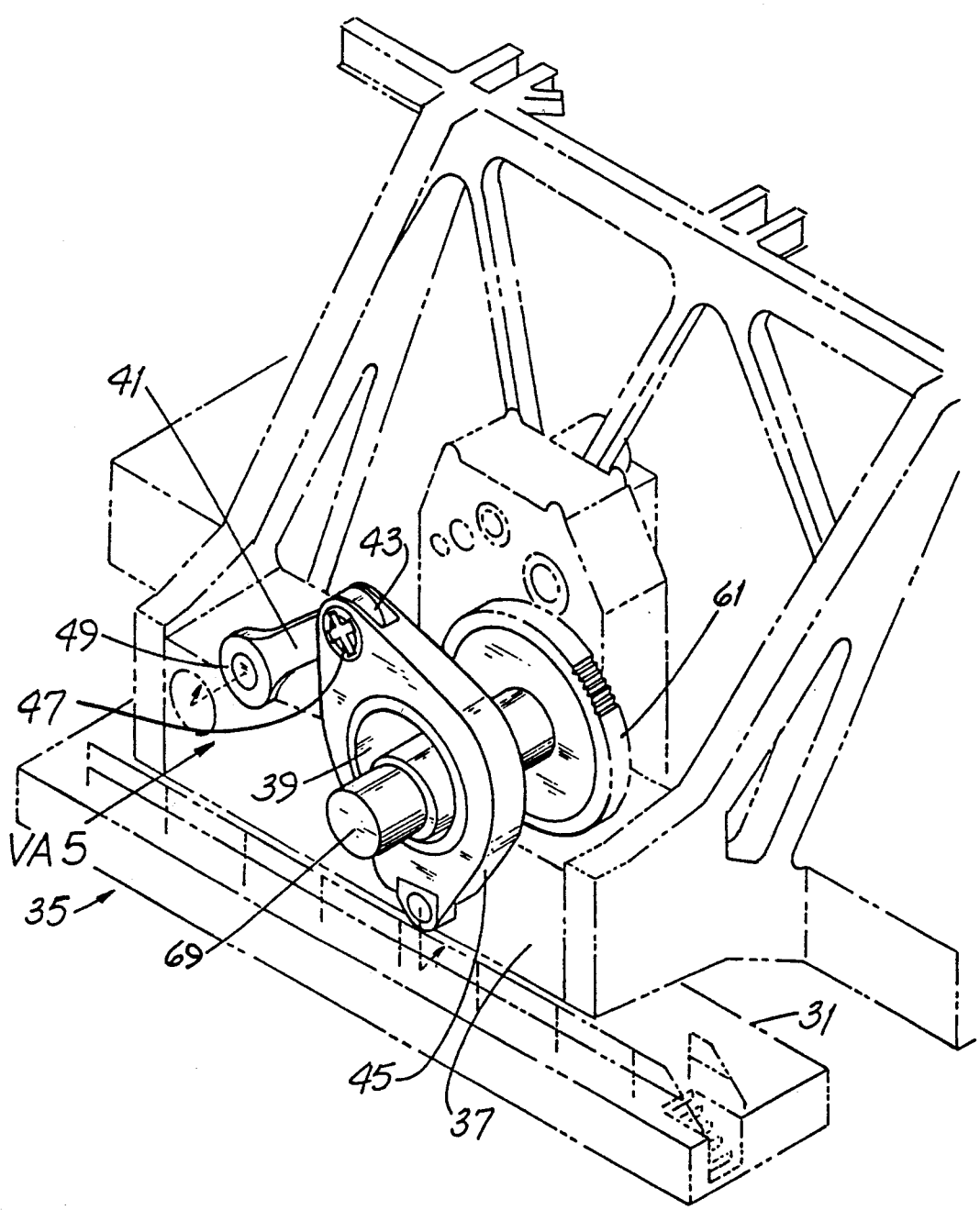
FIG. 4 is an isometric view of the dragline walk leg shown with related supporting structure.

Referring additionally to FIGS. 3A-3G and FIG. 4, a walk-like mechanism 35 typically includes a main structure 37, a driven eccentric 39 and a knee link 41. The knee link 41 has its upper end 43 coupled to the walk leg housing 45 by a pin 47 to permit relative rotation of a few degrees between the link 41 and the housing 45. The lower end 49 of the knee link 41 is similarly coupled to the nearby main housing structure 37. As a rough analogy, the coupling at the upper end 43 of the link 41 is analogous to the human knee and the eccentric 39 is analogous to the human hip joint. In FIG. 4, numeral 39 indicates the location of the eccentric which is shown in FIG. 5.

As the eccentric 39 is driven counterclockwise (in FIG. 4 and in the right-side sequence of FIGS. 3A-3G) through one revolution, the shoe 31 is lowered to ground contact, the shoe teeth 32 engage the ground and the dragline 11 lifted and moved rearward. The shoe 31 is then raised until the platform 27 again rests on the surface 29.

Since the bucket 17 is drawn toward the dragline 11, removal of overburden 51 progresses toward the dragline 11 until the edge 53 of the pit becomes relatively near to the dragline 11. Therefore, the dragline 11 must occasionally be moved rearward a few feet to expose additional overburden 51 for digging.

Figure 5:
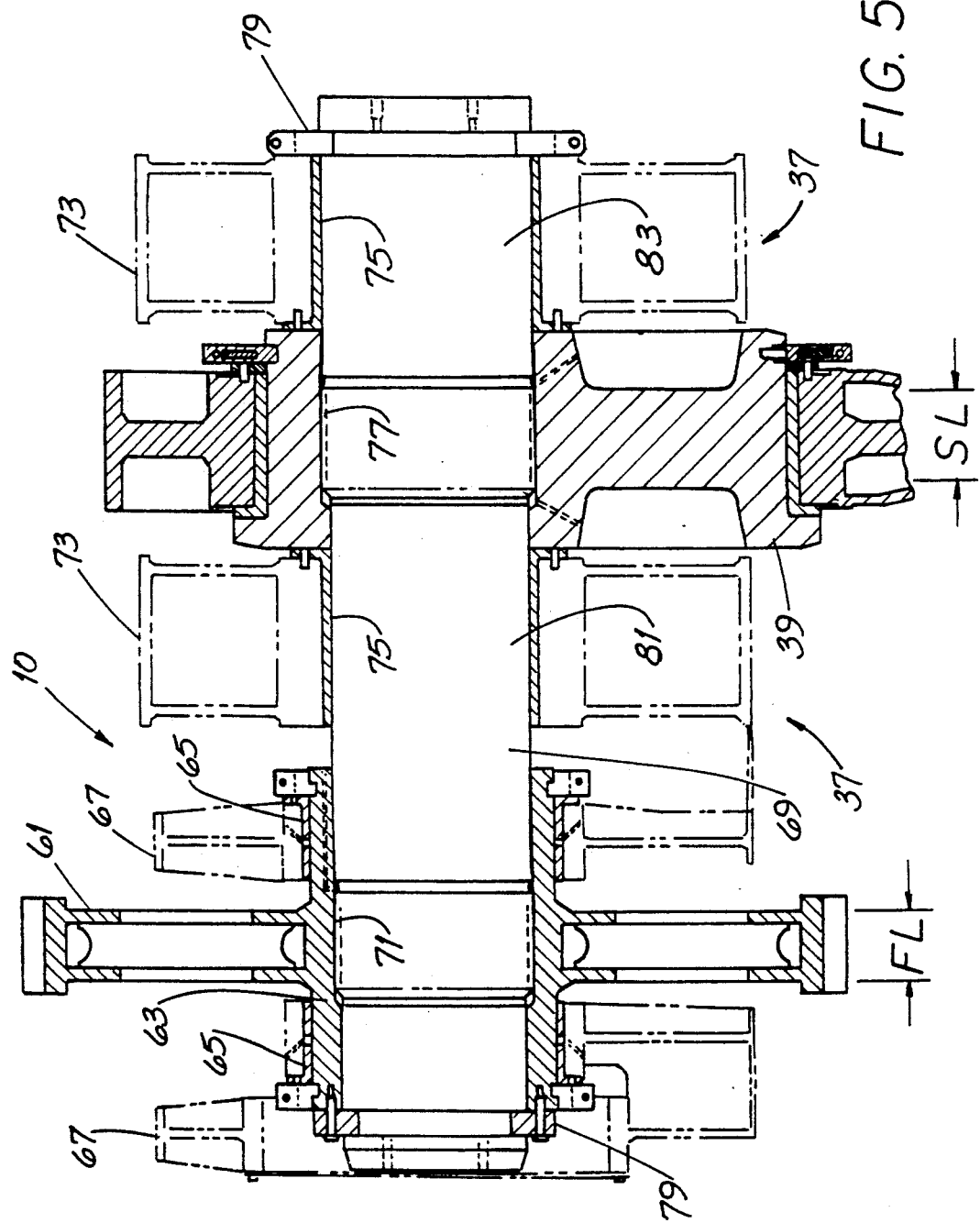
FIG. 5 is a view, partly in cross-section and with parts shown in phantom, outline, taken through the center axis of the eccentric drive shaft and showing the eccentric rotated to a position where the shaft is near the top of the eccentric.

FIG. 5 depicts the improved apparatus 10 and shows a portion of the drive train components of a walking dragline walk leg mechanism 35. Such components include a drive gear 61 connected (through other drive train components not shown) to the drive 25 for the walking system. Such drive 25 turns the gear 61 (by driving a much smaller spur gear not shown) and rotates the eccentric 39 to "walk" the dragline 11 rearward. The gear 61 is mounted to what is known as a "quill," 63 i.e., a hollow shaft supported for rotation at either end by a bearing 65 which can be a "rolling-type" anti-friction bearing or a journal bearing. This pair of bearings 65 is referred to in this specification as a first set of bearings. In turn, the bearings 65 are supported by the structural framework 67 of the dragline 11.

A shaft 69 extends through the quill 63 and the quill 63 connects the gear 61 to the shaft 69 by a first set of teeth 71 extending along a first length "FL." Preferably, the teeth comprising the first set (teeth on the interior of the quill and teeth on the exterior of the shaft) are spline teeth. In the absence of load, spline teeth can readily slide with respect to one another.

A driven member embodied as an eccentric 39 is positioned between the sides 73 of the walk leg structure 37 and supports the linkage extending to the shoe 31. The shaft 69 also extends through the eccentric 39 and through a bearing 75 at either side of the eccentric 39. Like bearing 65, bearing 75 can be a "rolling-type" anti-friction bearing or a journal bearing. Such bearings 75 are referred to in this specification as a second set of bearings and both such bearings 75 are doweled or otherwise affixed to the housing 37 to prevent bearing rotation as the dragline 11 "walks." From the foregoing, it will be apparent that the shaft both supports the eccentric 39 (and the linkage) and drives the eccentric 39.

A second set of teeth 77 connects the shaft 69 and the eccentric 39 along a second length "SL" which is greater than the first length "FL." Preferably, the teeth comprising the second set 77 (teeth on the interior of the eccentric 39 and teeth on the exterior of the shaft 69) are also spline teeth. It is to be emphasized that the lengths FL and SL refer to the teeth sets described above. The designations for such lengths are brought to the bottom of FIG. 5 for clarity.

The shaft 69 is retained in the illustrated position by a keeper 79 engaging a groove at each end of the shaft 69. For reasons that will become apparent, it is preferred that the bore diameter(s) of the bearings 75 and the diameter(s) of the neck portion 81 and outer end 83 of the shaft 69 are cooperatively selected to permit the shaft 69 to be withdrawn outward, i.e., to the right in FIG. 5, when the left-side keeper 79 is removed.

It should be appreciated that in many applications, other kinds of "teeth" can be used to connect drive train components. For example, the openings through the quill 63 and eccentric 39 may have the shape of a polygon (e.g., a square or hexagon) or may be elliptical or have some other geometric shape. The shaft 69 may be similarly shaped, at least in the areas where the shaft 69 engages the quill 63 and eccentric 39. Unless otherwise stated, the term "teeth" as used herein means a structural feature having any shape (including a key and keyway) capable of transmitting torque.

Referring to FIGS. 2, 4 and 5, when it is required that the dragline 11 be moved, the walk leg motor is energized and the gear 61, the quill 63, the shaft 69 and the eccentric 39 rotate to "cycle" the walk leg mechanism 35 through one step. In so doing, the gear 69, quill 63, shaft 69 and eccentric 39 make one revolution.

From FIG. 4 and the sequence of FIGS. 3A-3G, it will be apparent that those gear teeth and quill teeth (as well as those of the shaft 69 and eccentric 39) which are most heavily loaded extend only about 120° around the perimeter of the gear 61 and the interior perimeter of the quill 63. The heavily loaded teeth are those transmitting torque to actually lift and lower the dragline 11. Therefore, over time, such teeth will wear significantly more than the remaining teeth. As will be recognized by persons of ordinary skill, all teeth 71, 77 in the first set and the second set are in continuous engagement and wear evenly, even though the teeth on the gear 61 wear unevenly.

Figure 6:
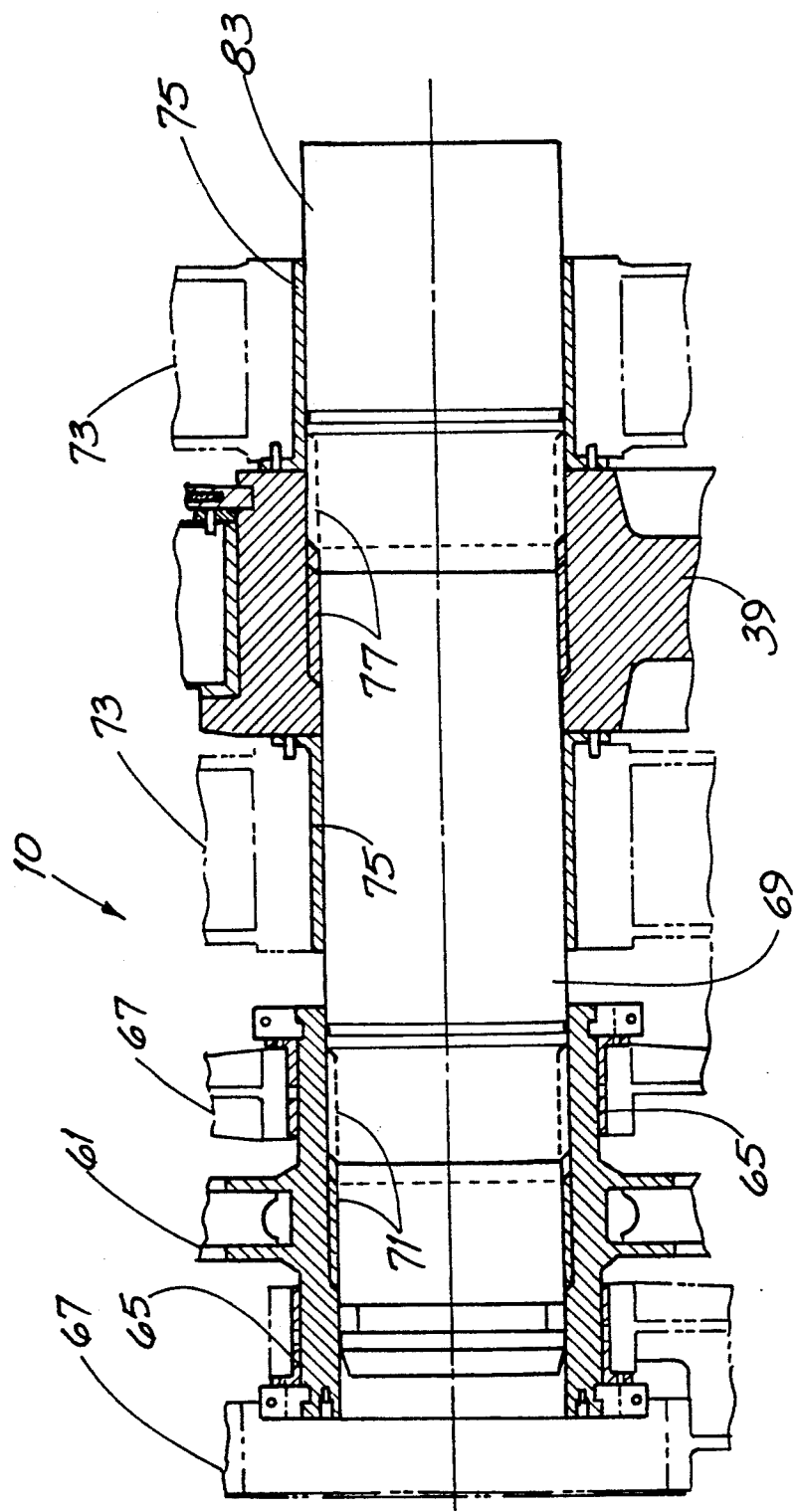
FIG. 6 is a view like that of FIG. 5 (but with parts broken away) and showing the shaft moved to a disconnect position.

When wear on the teeth of the gear 61 is sufficient to warrant, the left-side keeper 79 is removed and the shaft 69 moved axially outward from the drive position as shown in FIG. 5 to a disconnect position shown in FIG. 6. The disconnect position is that at which the teeth 71 comprising the first set of teeth are disengaged from one another but the teeth 77 comprising the second set of teeth are still partially engaged.

It should be observed that when the shaft 69 is in the disconnect position as shown in FIG. 6, the shaft 69 is nevertheless supported by the bearings 75 and the gear 61 and quill 63 are supported by the bearings 65. To put it another way, one need not have auxiliary lifting equipment as might otherwise be needed to handle the gear and/or to fully withdraw the shaft 69 and lay it aside. With a large shaft 69 having a length of about 18 feet as with the shaft 69 in the exemplary dragline 11, this is an enormous advantage. Another, more subtle advantage is that the rotated relationship of the shaft 69 and the eccentric 39 to one another is not disturbed. In the case of a shaft 69 required to be fully withdrawn, re-insertion may mean matching up "timing marks" to regain such rotated relationship. In any event, if the shaft 69 were required to be fully withdrawn (a requirement obviated by the invention), the teeth 77 would certainly be required to be rotationally aligned before the shaft 69 could be re-inserted.

It should also be observed that when the quill 63 and shaft 69 are disconnected from one another as described, the gear 61 (which is still coupled to the drive motor) can be rotated 120° ("indexed") to a new position relative to the eccentric 39 by using the drive motor. This, too, is an enormous advantage in the case of a gear 61 having a diameter of about 14 feet and weighing (with the quill 63) about 73,000 pounds as in the exemplary dragline 11. Preferably, the gear 61 has at least one or two timing marks (not shown). In the preferred embodiment, there are three timing marks placed thereon about 120° apart so that maintenance personnel can visually note when the gear has been properly indexed.

While the principles of this invention have been described in connection with specific embodiments, it should be understood clearly that these descriptions are made only by way of example and are not intended to limit the scope of the invention.

We claim:

1. In a machine having a drive gear, a driven member unequally loading gear teeth and a shaft transferring driving power from the gear to the member, the improvement wherein:

the shaft is supported for axial movement;

a quill connects the gear to the shaft by a first set of teeth extending along a first length; and, a second set of teeth connects the shaft and the member along a second length greater than the first length, whereby axial shaft movement along the first length disconnects the gear for free gear rotation while maintaining shaft-member connection.

2. The improvement of claim 1 wherein the quill is supported for rotation on bearings and the drive gear is mounted to the quill.

3. The improvement of claim 2 wherein the first set of teeth includes mating teeth on the interior of the quill and on the exterior of the shaft and the second set of teeth includes mating teeth on the interior of the driven member and on the exterior of the shaft.

4. The improvement of claim 1 wherein the machine is a walking dragline, the driven member is a walk leg eccentric and the gear may be freely rotated to an index position.

5. The improvement of claim 1 wherein the gear is connected to a source of driving power and rotated by such source when the shaft and quill are disconnected from one another.

6. The improvement of claim 1 wherein the shaft is mounted for axial movement between a drive position and a disconnect position and in the disconnect position is supported by a set of bearings whereby the shaft is disconnected from the gear and the gear freely rotated without using auxiliary lifting equipment.

7. The improvement of claim 1 wherein:

the quill is supported for rotation on a first set of bearings;

the drive gear is mounted to the quill;

the shaft is mounted for axial movement between a drive position and a disconnect position;

in the disconnect position, the shaft is supported by a second set of bearings; and, the gear is connected to a source of driving power and rotated by such source when the shaft and quill are disconnected from one another, whereby the shaft is disconnected from the gear and the gear freely rotated without using auxiliary lifting equipment.

8. The improvement of claim 1 wherein the machine is a walking dragline, the driven member is a walk leg eccentric and the gear may be freely rotated to an index position.

* * * * *